(12) United States Patent
Ducharme et al.

(10) Patent No.: US 8,577,024 B2
(45) Date of Patent: Nov. 5, 2013

(54) CONCEALING PLAIN TEXT IN SCRAMBLED BLOCKS

(75) Inventors: Paul D. Ducharme, Richmond Hill (CA); Weiguo Jao, Toronto (CA)

(73) Assignee: VIXS Systems, Inc, Toronto, Ontario (CA)

(*) Notice: Subject to any disclaimer, the term of this patent is extended or adjusted under 35 U.S.C. 154(b) by 892 days.

(21) Appl. No.: 12/511,042

(22) Filed: Jul. 28, 2009

(65) Prior Publication Data
US 2011/0026712 A1  Feb. 3, 2011

(51) Int. Cl.
*H04L 9/00* (2006.01)

(52) U.S. Cl.
USPC ........ 380/28; 713/160; 713/161; 713/168; 713/169

(58) Field of Classification Search
USPC .................. 713/160, 161, 168, 169
See application file for complete search history.

(56) References Cited

U.S. PATENT DOCUMENTS

| | | | |
|---|---|---|---|
| 4,405,829 A | 9/1983 | Rivest et al. | 178/22.1 |
| 6,061,449 A | 5/2000 | Candelore et al. | |
| 7,082,534 B2 * | 7/2006 | Tardo | 713/161 |
| 7,165,268 B1 * | 1/2007 | Moore et al. | 726/2 |
| 7,623,656 B2 * | 11/2009 | Hawkes et al. | 380/42 |

OTHER PUBLICATIONS

Lorenzo Peraldo, et al, Authenticated Encryption GCM-CCM, Dec. 2007, p. 1-21.
FIPS PUB 180-3, "Secure Hash Standard (SHS)", Oct. 2008, pp. 1-27.

* cited by examiner

*Primary Examiner* — Jeffrey Pwu
*Assistant Examiner* — Helai Salehi
(74) *Attorney, Agent, or Firm* — Garlick & Markison; Bruce E. Stuckman

(57) ABSTRACT

An apparatus generally having a first circuit and a second circuit is disclosed. The first circuit may be configured to (i) divide a plain text into at least three input blocks and (ii) generate at least three scrambled blocks by scrambling the input blocks using a first cipher process. The first cipher process may be configured such that a first of the input blocks does not affect the generation of a last scrambled block. The second circuit may be configured to (i) generate at least three output blocks by de-scrambling the scrambled blocks using a second cipher process and (ii) reconstruct the plain text from the output blocks. The second cipher process may be configured such that a first of the scrambled blocks affects the generation of all of the output blocks.

19 Claims, 8 Drawing Sheets

CONCEALING PLAIN TEXT IN SCRAMBLED BLOCKS

FIELD OF THE INVENTION

The present invention relates to data security generally and, more particularly, to a method and/or architecture for concealing plain text in scrambled blocks.

BACKGROUND OF THE INVENTION

Traditionally two types of encryption techniques are used to secure data: authentication techniques and cipher techniques. The authentication techniques are used to guarantee that a message was received intactly from a particular sender. However, authentication does not protect the contents of the message from being viewed. Instead, the authentication techniques protect the integrity of a message.

The cipher techniques are used to conceal the contents of a message transferred from the sender to the receiver. However, encryption, transmission and subsequent decryption do not guarantee that the message has not been altered during the transmission. The cipher techniques protect the confidentiality of the message.

Typically, authentication and cryptography are used in a two-step process. Received cipher text may be decrypted in a first step to generate the original plain text. The plain text may be authenticated during a second step. Such two-step processes commonly use a double buffer method, a first buffering during the decryption and a second buffering in support of the authentication.

It would be desirable to implement a technique where recovery and authentication of the plain text are achieved in a single step using a single buffer.

SUMMARY OF THE INVENTION

The present invention concerns an apparatus generally having a first circuit and a second circuit. The first circuit may be configured to (i) divide a plain text into at least three input blocks and (ii) generate at least three scrambled blocks by scrambling the input blocks using a first cipher process. The first cipher process may be configured such that a first of the input blocks does not affect the generation of a last scrambled block. The second circuit may be configured to (i) generate at least three output blocks by de-scrambling the scrambled blocks using a second cipher process and (ii) reconstruct the plain text from the output blocks. The second cipher process may be configured such that a first of the scrambled blocks affects the generation of all of the output blocks.

The objects, features and advantages of the present invention include providing a method and/or architecture for concealing plain text in scrambled blocks that may (i) be authenticated and de-scrambled in a single pass, (ii) consume a small amount of buffer space, (iii) provide a mechanism for a secure boot, (iv) protect secret values in one-time programmable memory of a chip, (v) maintain confidentiality of a transmitted message (vi) protect an integrity of the transmitted message and/or (vii) support detection of alterations in the transmitted message.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Embodiments of the present invention generally provide methods and/or architectures that allow for de-scrambling multiple scrambled blocks and calculating a Message Authentication Code (MAC) in a single pass. A modified version of an Advanced Encryption Standard (AES)-Cipher Block Chaining (CBC) mode may be used to achieve economy in that the AES-CBC mode may to be applied a single time and utilizes a single memory buffer. The AES-CBC mode is defined in "Recommendation for Block Cipher Modes of Operation", NIST Special Publication 800-38A, 2001 edition, by the Computer Security Division, Information Technology Laboratory, National Institute of Standards and Technology, Gaithersburg, Md., and is hereby incorporated by reference in its entirety.

Figure 1:
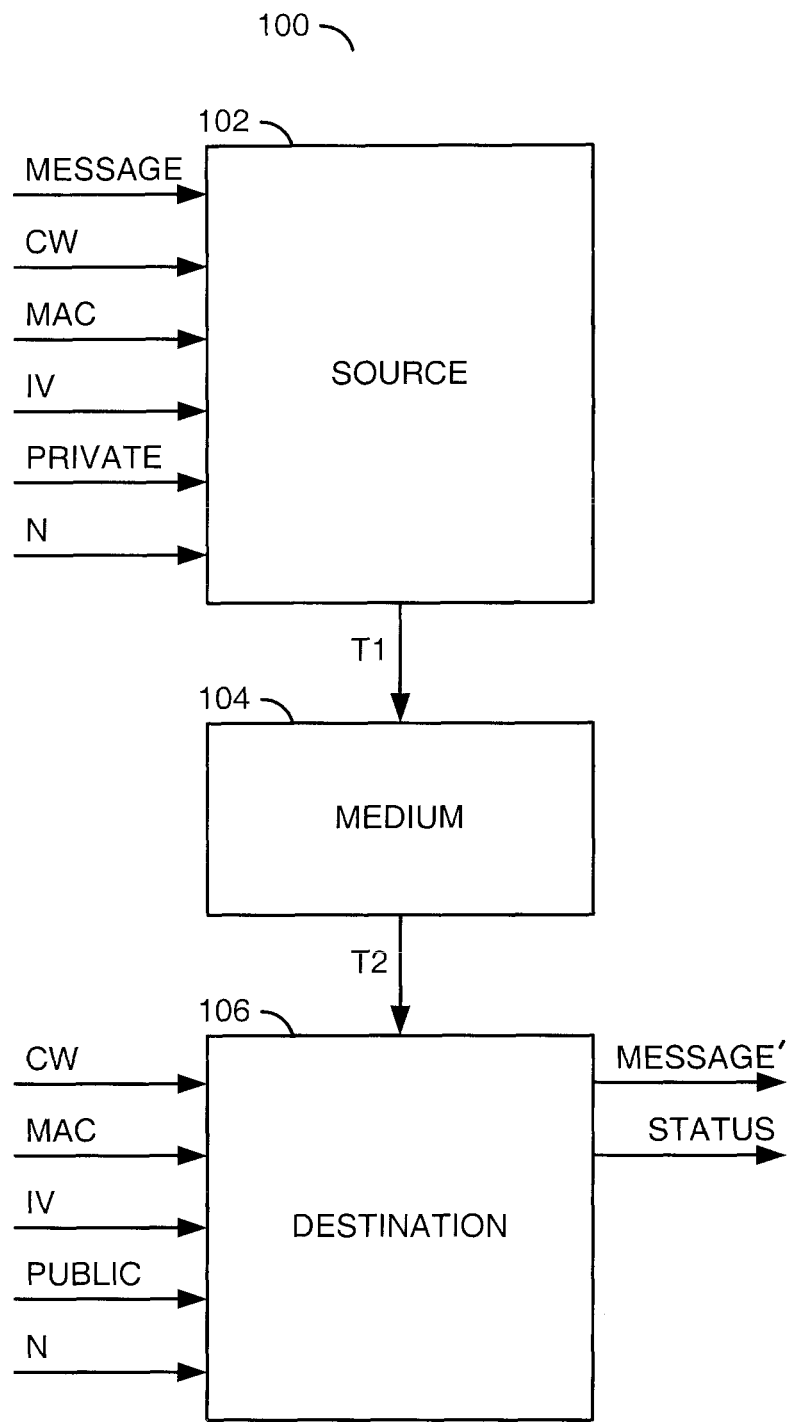
FIG. 1 is a block diagram of system in accordance with a preferred embodiment of the present invention.

Referring to FIG. 1, a block diagram of system 100 is shown in accordance with a preferred embodiment of the present invention. The system (or apparatus) 100 generally comprises a circuit (or module) 102, a circuit (or module) 104 and a circuit (or module) 106. The circuits 102 to 106 may be implemented in hardware, software, firmware or any combination thereof.

A signal (e.g., MESSAGE) may be received at an input of the circuit 102. The circuit 102 may also receive a signal (e.g., CW) at an input. A signal (e.g., T1) may be generated by the circuit 102 and presented to the circuit 104. The circuit 104 may transfer the received contents of the signal T1 to another signal (e.g., T2). The signal T2 may be received at an input of the circuit 106. A signal (e.g., MESSAGE') may be generated and presented from the circuit 106 at an output. The circuit 106 may also generate and present a signal (e.g., STATUS) at an output.

One or more optional signals (e.g., MAC, IV and N) may be received at one or more inputs to the circuit 102. The signals MAC, IV and N may also be optionally received at corresponding inputs to the circuit 106. The circuit 102 may receive an optional signal (e.g., PRIVATE). The circuit 106 may receive a corresponding optional signal (e.g., PUBLIC). The presence or absence of the signals MAC, IV, N, PRIVATE and PUBLIC may vary depending on the particular implementation of the system 100.

The circuit 102 may implement a source circuit. The circuit 102 is generally operational to scramble data received in the signal MESSAGE to generate the signal T1. Scrambling may be governed by a control word received in the signal CW. The scrambling generally (i) divides a plain text containing the message into at least three input blocks and (ii) generates at least three scrambled blocks by scrambling the input blocks using a cipher scrambling process. The scrambled blocks may be subsequently transmitted from the circuit 102 in the signal T1. The cipher scrambling process is generally configured such that a first (initial) block of the input blocks does not affect the generation of a last (final) block of the scrambled blocks. In some embodiments, the cipher scrambling process may comprise an AES-CBC decryption operation. Other scrambling techniques may be implemented to meet the criteria of a particular application.

The circuit 102 may receive (i) an initialization vector in the signal IV and/or (ii) a message authentication code in the signal MAC that are used in the scrambling process in some embodiments. In other embodiments, the initialization vector and/or the message authentication code may be generated internal to the circuit 102. An exponent of a private key and a corresponding modulus value may be received by the circuit 102 in the signals PRIVATE and N, respectively. The private exponent and the modulus value may be used by the circuit 102 to calculate a digital signature for the message. In some embodiments, the circuit 102 may operate as a black-box residing in a secure environment.

The circuit 104 may be implemented as a transmission and/or storage medium. The circuit 104 is generally operational to convey data received in the signal T1 from the circuit 102 to the circuit 106 in the signal T2. In an error-free storage/transfer, the data within the signal T2 may match the data within the signal T1. In some embodiments, the circuit 104 may provide a secure environment for moving the data from the circuit 102 to the circuit 106.

The circuit 106 may implement a destination circuit. The circuit 106 is generally operational to de-scramble and authenticate the message received in the signal T2 from the circuit 104. The de-scrambling may be governed by the control word received in the signal CW. The de-scrambling may (i) generate at least three output blocks by de-scrambling the scrambled blocks using a cipher process and (ii) reconstruct the plain text carrying the message from the output blocks. The scrambled blocks are generally received via the signal T2. The cipher de-scrambling process may be configured such that a first (initial) block of the scrambled blocks affects the generation of all of the output blocks. In some embodiments, the cipher de-scrambling process may comprise an AES-CBC encryption operation. Other de-scrambling techniques may be implemented to meet the criteria of a particular application. The circuit 106 may assert/de-assert the signal STATUS based on the outcome of authenticating the message. If a digital signature is included in the signal T2, the signal STATUS may comprise multiple signals, a first signal to indicate a pass/fail condition of the authentication and a second signal to indicate a pass/fail condition of the digital signature verification.

In some embodiments, the circuit 106 may receive (i) the initialization vector in the signal IV and/or (ii) the message authentication code in the signal MAC for use in the de-scrambling process. In other embodiments, the initialization vector and/or the message authentication code may be generated internal to the circuit 106 using the data received in the signal T2. In some embodiments, an exponent of a public key and the corresponding modulus value may be received by the circuit 106 in the signals PUBLIC and N, respectively. The public exponent and the modulus value may be used by the circuit 106 to calculate a data field. The data field may be used to verify the signal T2. In some embodiments, the circuit 106 may operate as a secure circuit within a chip, die or integrated circuit.

An embodiment of the system 100 may be referred to as a symmetric (or simple) technique of scrambling and de-scrambling that does not utilize a digital signature. Another embodiment of the system 100 may be referred to as an asymmetric (or complex) technique that utilizes a digital signature. The circuit 102 may scramble a message (MSG) using the symmetric scrambling technique as follows:

T1=AES-CBC-DEC[(MSG|PAD|MAC), CW, IV]

where AES-CBC-DEC generally refers to the AES-CBC decryption process, "|" indicates concatenation, PAD is padding, MAC is a message authentication code (e.g., "VERIFIEDGOODTOGO"), CW is a control word and IV is an initialization vector.

The circuit 102 may scramble a message using the asymmetric scrambling technique as follows:

T1=AES-CBC-DEC[(MSG|PAD), CW, IV]|SIG

MAC=a first number (e.g., 16) of last bytes of the of plain text

E(MAC)=a second number (e.g., 16) of last bytes of the scrambled text

SIG=(MAC|E(MAC)|IV)^PRIVATE mod N where SIG refers to a digital signature, PRIVATE is a private exponent and N is a modulus value.

The circuit 106 generally de-scrambles the message created with the symmetric scrambling technique using a symmetric de-scrambling technique as follows:

MSG=AES-CBC-ENC[(MSG|PAD|MAC), CW, IV]

Authenticate: MAC=authentication code where AES-CBC-ENC generally refers to the AES-CBC encryption process.

The circuit 106 may de-scramble the message created with the asymmetric scrambling technique using an asymmetric de-scrambling technique as follows:

MSG=AES-CBC-ENC[(MSG|PAD), CW, IV]|SIG

Verify: MAC|E(MAC)|IV=SIG^PUBLIC mod N

Authenticate: the first number of last bytes of AES-CBC-ENC[(MSG|PAD), CW, IV]=MAC AND the second number of last bytes of AES-CBC-DEC[(MSG|PAD), CW, IV]=E(MAC)

Figure 2:
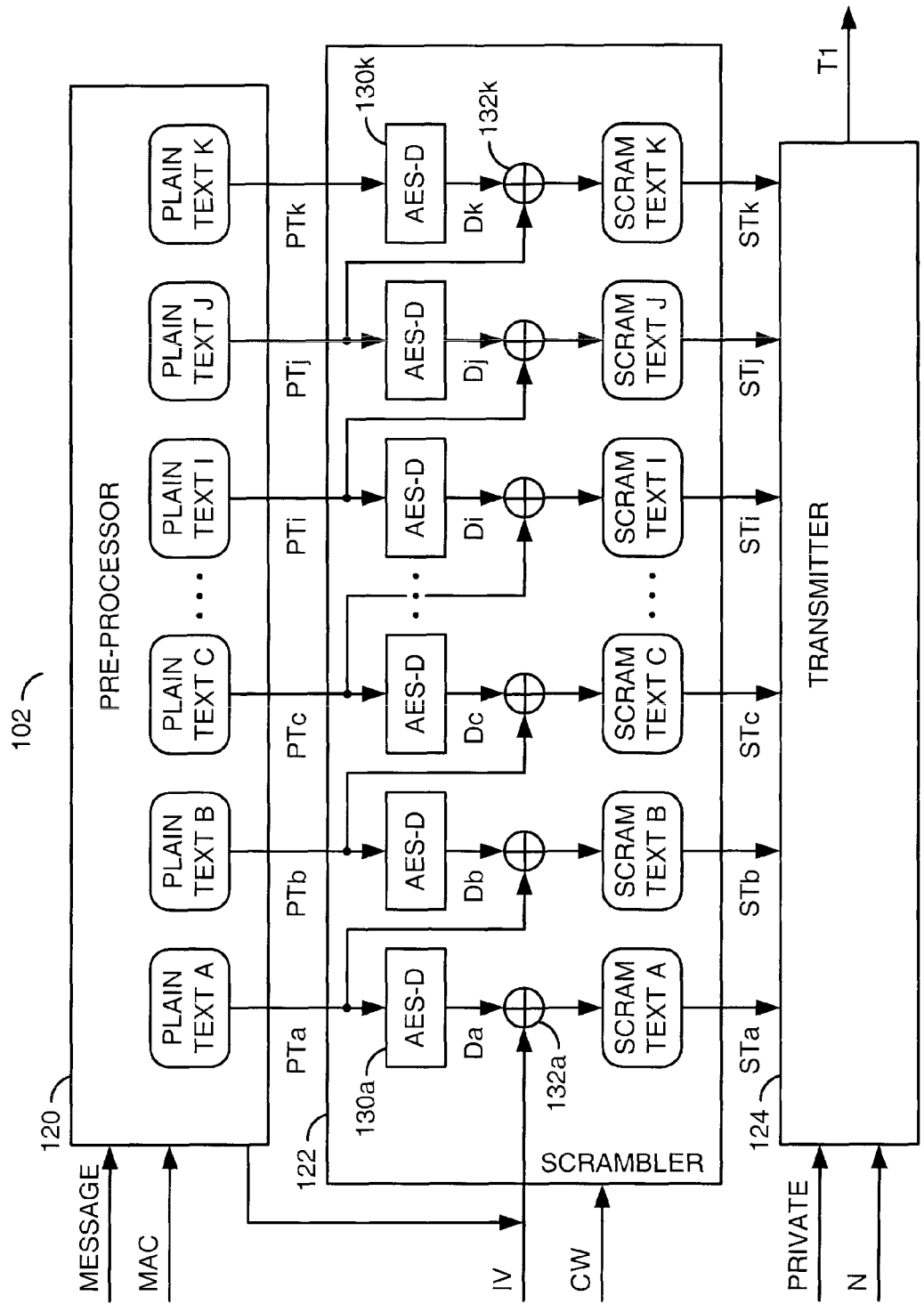
FIG. 2 is a block diagram of an example implementation of a source circuit.

Referring to FIG. 2, a block diagram of an example implementation of the circuit 102 is shown. The circuit (or apparatus) 102 generally comprises a circuit (or module) 120, a circuit (or module) 122 and a circuit (or module) 124. The circuits 120 to 124 may be implemented in hardware, software, firmware or any combination thereof.

The circuit 120 may receive a message in the signal MESSAGE at an input. If processing by the symmetric technique, the circuit 120 may also receive a message authentication code in the signal MAC at an input. A set of plain text signals (e.g., PTa-PTk) may be generated by the circuit 120 and presented to the circuit 122. If processing by the asymmetric technique, the circuit 120 may also generate and present the signal IV to the circuit 122.

The circuit 122 may receive a control word in the signal CW at an input. The signals PTa-PTk may be received at inputs to the circuit 122 from the circuit 120. An initialization vector may be received in the signal IV at an input from either the circuit 120 (e.g., asymmetric technique) or another source (e.g., symmetric technique). A set of scrambled text signals (e.g., STa-STk) may be generated by the circuit 122 and presented to the circuit 124.

The circuit 124 may receive the signals STa-STk from the circuit 122. If using the asymmetric technique with a digital signature, the signals PRIVATE and N may also be received into the circuit 124. The circuit 124 may generate and present the signal T1.

The circuit 120 generally implements a pre-processor circuit. The circuit 120 may be operational to pad the incoming message and divide the resulting plain text into multiple (e.g., ≥3) blocks. Each of the resulting blocks (e.g., PLAIN TEXT A-PLAIN TEXT K) may be presented in a corresponding signal PTa-PTk. Where the circuit 102 implements the asymmetric technique, the circuit 120 may also be operational to generate a message authentication code. The message authentication code may be transferred from the circuit 120 to the circuit 122 via the signal MAC.

The circuit 122 generally implements a scrambler circuit. The circuit 122 may be operational to scramble the blocks PLAIN TEXT received in the signals PTa-PTk to create blocks of scrambled text (e.g., SCRAMBLED TEXT A-SCRAMBLED TEXT K). The blocks SCRAMBLED TEXT may be presented to the circuit 124 in the corresponding signals STa-STk.

The circuit 124 may implement a transmitter circuit. The circuit 124 is generally operational to combine the blocks SCRAMBLED TEXT to create the signal T1. Where the asymmetric technique is used, the circuit 124 may also be operational to calculate a digital signature and incorporate the digital signature into the signal T1. Calculation of the digital signature may be based on private exponent received in the signal PRIVATE and a modulus value received in the signal N.

The circuit 122 generally comprises one or more circuits (or modules) 130a-130k and one or more circuits (or modules) 132a-132k. The circuits 130a-130k to 132a-132k may be implemented in hardware, software, firmware or any combination thereof.

Each of the circuits 130a-130k may receive a corresponding one of the signals PTa-PTk. A set of signals (e.g., Da-Dk) may be generated by the circuits 130a-130k and presented to the circuits 132a-132k. The circuit 132a-132k may generate and present the signals STa-STk. The first circuit 132a may receive the initialization vector through the signal IV. The second circuit 132b may receive the block PLAIN TEXT A in the signal PTa. The third circuit 132c may receive the block PLAIN TEXT B in the signal PTb. Each of the subsequent circuits 132d-132j may receive an adjoining block PLAIN TEXT via the signals PTc-PTi. The last circuit 132k may receive the second-to-last block PLAIN TEXT J in the signal PTj.

Each of the circuits 130a-130k may be implemented as a cipher circuit. The circuits 130a-130k are generally operational to perform a cipher process on a block PLAIN TEXT to create a corresponding block in the signals Da-Dk. The cipher processes may be controlled by the control word received by each of the circuits 130a-130k via the signal CW. In some embodiments, the cipher process may comprise the AES-CBC decryption process.

Each of the circuits 132a-132k generally implements an XOR logic circuit. The circuits 132a-132k may be operational to perform a bit-wise Boolean logical exclusive OR operation using (i) the signals Da-Dk as a first set of inputs and (ii) the signals IV and PTa-PTj as a second set of inputs.

The circuits 130a-130k and 132a-132k may be interconnected such that information in the block PLAIN TEXT A may influence at most the corresponding block SCRAMBLED TEXT A and the adjoining block SCRAMBLED TEXT B. Likewise, information in the block PLAIN TEXT B may influence at most the corresponding block SCRAMBLED TEXT B and the adjoining block SCRAMBLED TEXT C. The limited influence of data in the blocks PLAIN TEXT may repeatedly extent into the corresponding and the adjacent block SCRAMBLED TEXT.

In hardware embodiments, the circuit 130a-130k and 132a-132k may be arranged to operate in parallel and substantially simultaneously such that the blocks SCRAMBLED TEXT are generated from the blocks PLAIN TEXT in a single pass through the circuit 122. In software embodiments, each of the circuits 130a-130k and 132a-132k may be a separate instantiation operating in parallel to achieve similar results as the hardware implementations.

Some implementations may use a single hardware (or software) circuit 130a and a single hardware (or software) circuit 132a. Therefore, each of the blocks PLAIN TEXT may be processed sequentially to create the blocks SCRAMBLED TEXT. Other combinations of hardware, software and sets of circuits 130a-130k and 132a-132k may be implemented to meet the criteria of a particular application.

Figure 3:
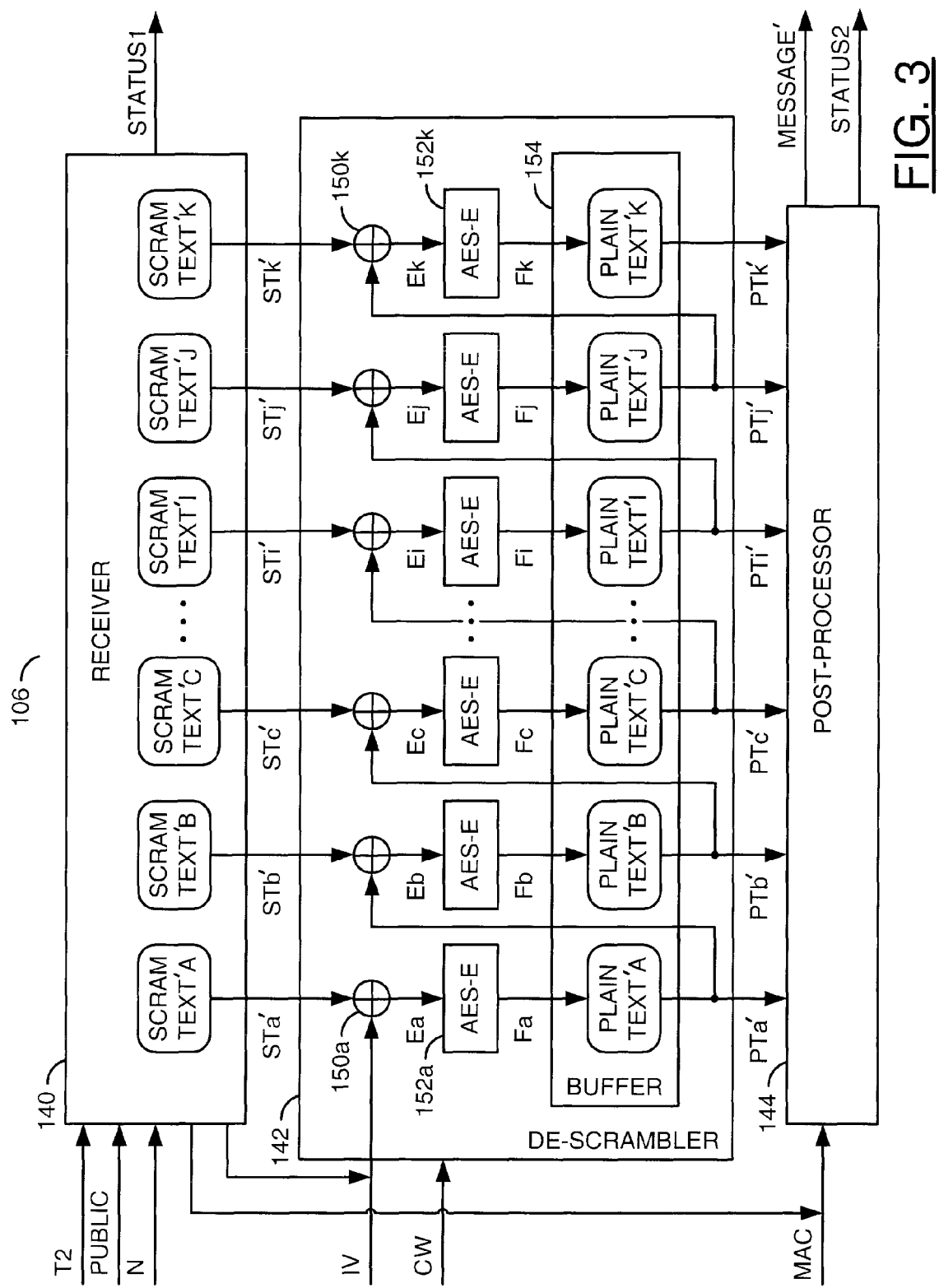
FIG. 3 is a block diagram of an example implementation of a destination circuit.

Referring to FIG. 3, a block diagram of an example implementation of the circuit 106 is shown. The circuit (or apparatus) 106 generally comprises a circuit (or module) 140, a circuit (or module) 142 and a circuit (or module) 144. The circuits 140 to 144 may be implemented in hardware, software, firmware or any combination thereof.

The circuit 140 may receive the scrambled text via the signal T2. A signal (e.g., STATUS1) may be generated by the circuit 140 where verification of a digital signature is implemented. The signal STATUS1 may be a component of the signal STATUS. If processing by the asymmetric technique, the circuit 140 may also receive a public exponent of a public key in the signal PUBLIC and the modulus value in the signal N. The public exponent may be associated with the private exponent used by the circuit 124. The circuit 140 may generate and present a set of signals (e.g., STa'-STk') to the circuit 142. If processing by the asymmetric technique, the circuit 140 may also generate and present (i) the initialization vector in the signal IV and (ii) the message authentication code in the signal MAC.

The circuit 142 may receive the control word in the signal CW at an input. The signals STa'-STk' may be received at inputs of the circuit 142 from the circuit 140. The initialization vector may be received in the signal IV at an input from either the circuit 140 (e.g., asymmetric technique) or another source (e.g., symmetric technique). A set of recovered plain text signals (e.g., PTa'-PTk') may be generated by the circuit 142 and presented to the circuit 144.

The circuit 144 may receive the signals STa'-STk' from the circuit 142. The message authentication code may be received in the signal MAC from either the circuit 140 (e.g., asymmetric technique) or another source (e.g., symmetric technique). A recreated message may be presented by the circuit 144 in a signal (e.g., MESSAGE'). A signal (e.g., STATUS2) may also be generated and presented by the circuit 144. Where the signal STATUS1 included in the design, the signal STATUS2 may be another component of the signal STATUS. Where the signal STATUS1 is not part of the design, the signal STATUS2 may be the signal STATUS.

The circuit 140 generally implements a receiver circuit. The circuit 140 may be operational to divide the incoming scrambled text into the number of blocks (e.g., ≥3) established by the circuit 120. Each of the recreated blocks (e.g., SCRAMBLED TEXT' A-SCRAMBLED TEXT' K) may be presented in a corresponding signal STa'-STk'. Where the circuit 106 implements the asymmetric technique, the circuit 140 may also be operational to recreate the digital signature from the signal T2 and verify that the recreated digital signature is correct. Results of the verification may be indicated by asserting/de-asserting the signal STATUS1 to represent pass/fail. The circuit 140 may also recreate the initialization vector and the message authentication code from the signal T2 where implementing the asymmetric technique.

The circuit 142 generally implements a de-scrambler circuit. The circuit 142 may be operational to de-scramble the blocks SCRAMBLED TEXT' received in the signals STa'-STk' to recreate the blocks of plain text (e.g., PLAIN TEXT' A-PLAIN TEXT' K) The recreated blocks PLAIN TEXT' may be presented to the circuit 144 in the signals PTa'-PTk'.

The circuit 144 may implement a post-processor circuit. The circuit 144 is generally operational to combine the blocks PLAIN TEXT' to recreate the original message in the signal MESSAGE'. The circuit 144 may also be operational to authenticate the recovered message based on the message authentication code received in the signal MAC. The circuit 144 may assert/de-assert the signal STATUS2 to indicate a pass/fail of the authentication check.

The circuit 142 generally comprises one or more circuits (or module) 150a-150k, one or more circuit (or modules) 152a-152k and a circuit (or module) 154. The circuits 150a-150k to 154 may be implemented in hardware, software, firmware or any combination thereof.

Each of the circuits 150a-150k may receive a corresponding one of the signals STa'-STk'. A set of signals (e.g., Ea-Ek) may be generated by the circuits 150a-150k and presented to the circuits 152a-152k. The circuit 152a-152k may generate and present a set of signals (e.g., Fa-Fk) to the circuit 154. The circuit 154 may generate and present the signals PTa'-PTk' to the circuit 144 and the circuits 150b-150k. The first circuit 150a may receive the initialization vector through the signal IV. The second circuit 150b may receive the block PLAIN TEXT' A in the signal PTa'. The third circuit 150c may receive the block PLAIN TEXT' B in the signal PTb'. Each of the subsequent circuits 150d-150j may receive an adjoining block PLAIN TEXT' via the signals PTc'-PTi'. The last circuit 150k may receive the second-to-last block PLAIN TEXT' J in the signal PTj'.

Each of the circuits 150a-150k generally implements an XOR logic circuit. The circuits 150a-150k may be operational to perform a bit-wise Boolean logical exclusive OR operation using (i) the signals STa'-STk' as a first set of inputs and (ii) the signals IV and PTa'-PTj' as a second set of inputs.

Each of the circuits 152a-152k may be implemented as a cipher circuit. The circuits 152a-152k are generally operational to perform a cipher process on a corresponding block SCRAMBLED TEXT' to create a corresponding recovered block (e.g., PLAIN TEXT' A-PLAIN TEXT' K) in the signals Fa-Fk. The cipher processes may be controlled by the control word received by each of the circuits 152a-152k via the signal CW. In some embodiments, the cipher process may comprise the AES-CBC encryption process. Other cipher processes may be implemented to meet the criteria of a particular application.

The circuit 154 may be implemented as a memory circuit. The circuit 154 is generally operational to buffer the recovered blocks PLAIN TEXT' received from the circuits 152a-152k. The circuit 154 may present the buffered blocks PLAIN TEXT' to the circuit 144 and the circuits 150b-150k in the corresponding signals PTa'-PTk' for additional processing and testing.

The circuits 150a-150k and 152a-152k may be interconnected such that information in the block SCRAMBLED TEXT' A may influence all of the blocks PLAIN TEXT' (e.g., PLAIN TEXT' A-PLAIN TEXT' K). Likewise, information in the block SCRAMBLED TEXT' B may influence the corresponding block PLAIN TEXT' B and all of the remaining blocks PLAIN TEXT' (e.g., PLAIN TEXT' B-PLAIN TEXT' K). The ripple influence of data in the blocks SCRAMBLED TEXT' into all subsequent blocks PLAIN TEXT' may be repeated for each of the blocks SCRAMBLED TEXT'.

In hardware embodiments, the circuit 150a-150k and 152a-152k may be arranged to operate in parallel and substantially simultaneously such that the blocks PLAIN TEXT' are generated from the blocks SCRAMBLED TEXT' in a single cascading pass through the circuit 142. In software embodiments, each of the circuits 150a-150k and 152a-152k may be a separate instantiation operating in parallel to achieve similar results as the hardware implementations.

Some implementations may use a single hardware (or software) circuit 150a and a single hardware (or software) circuit 152a. Therefore, each of the SCRAMBLED TEXT' blocks may be processed sequentially to create the blocks PLAIN TEXT'. Other combinations of hardware, software and sets of circuits 150a-150k and 152a-152k may be implemented to meet the criteria of a particular application.

Figure 4:
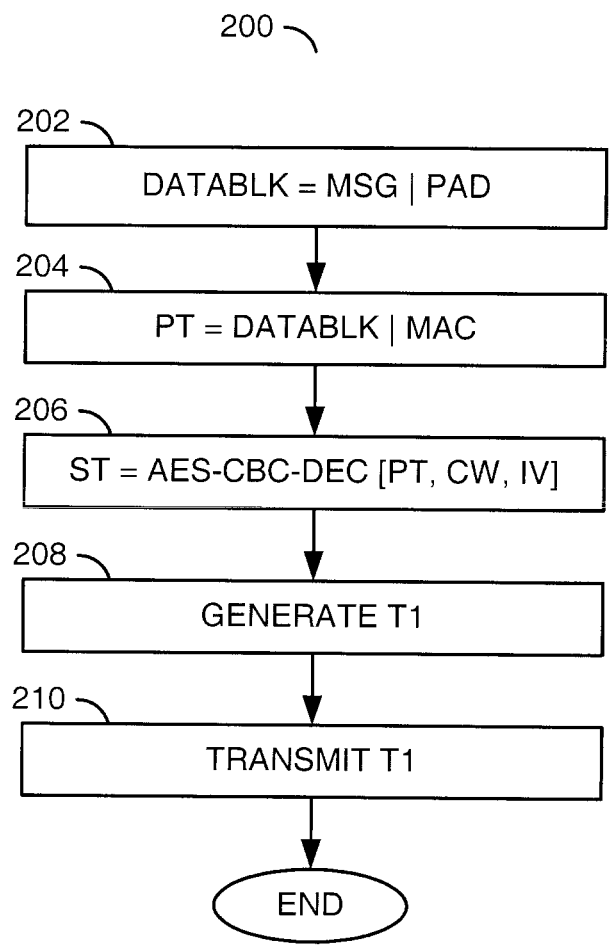
FIG. 4 is a flow diagram of an example process implementing a symmetric scrambling technique.

Referring to FIG. 4, a flow diagram of an example process 200 implementing the symmetric scrambling technique at a source is shown. The process (or method) 200 generally comprises a step (or block) 202, a step (or block) 204, a step (or block) 206, a step (or block) 208 and a step (or block) 210. The process 200 may be implemented by the circuit 102. The steps 202 to 210 may be implemented in hardware, software, firmware or any combination thereof.

In the step 202, a message (MSG) may be padded (PAD) with random bytes by the circuit 120 in order to form a multi-byte (e.g., 16-byte) aligned data block (e.g., DATABLK). A known message authentication code (MAC) may be appended to the data block in the step 204 by the circuit 120 to form the blocks PLAIN TEXT (abbreviated PT). An example of the MAC may be a code "VERIFIEDGOODTOGO". The circuit 122 may scramble the blocks PLAIN TEXT in the step 206 to generate the blocks SCRAMBLED TEXT (abbreviated ST). In the step 208, the circuit 124 may combine the blocks SCRAMBLED TEXT into the signal T1. The signal T1 may be transferred from the circuit 124 to the circuit 104 in the step 210.

Figure 5:
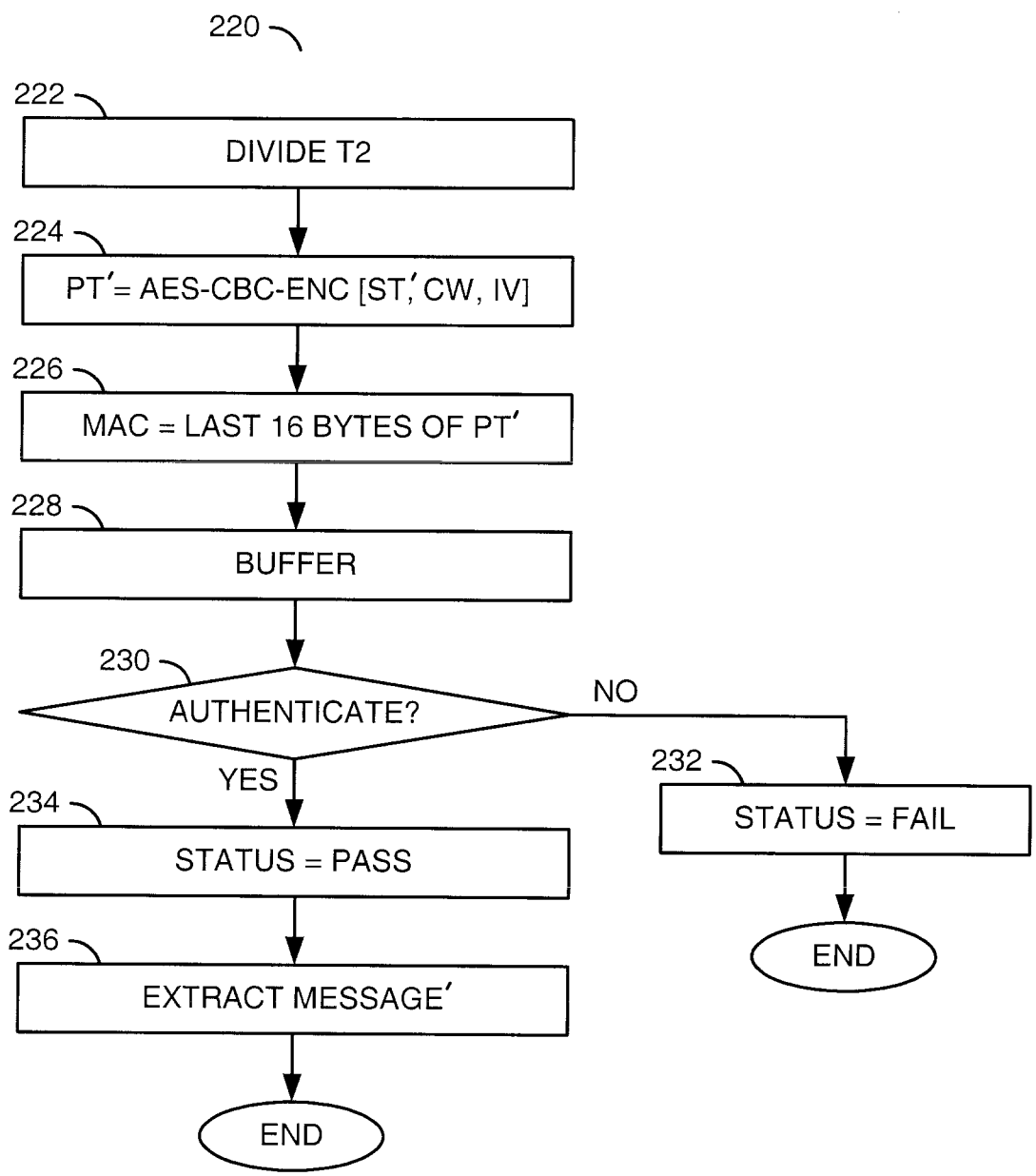
FIG. 5 is a flow diagram of an example process implementing a symmetric de-scrambling technique.

Referring to FIG. 5, a flow diagram of an example process 220 implementing the symmetric de-scrambling technique at a destination is shown. The process (or method) 220 generally comprises a step (or block) 222, a step (or block) 224, a step (or block) 226, a step (or block) 228, a step (or block) 230, a step (or block) 232, a step (or block) 234 and a step (or block) 236. The process 220 may be implemented by the circuit 106. The steps 222 to 236 may be implemented in hardware, software, firmware or any combination thereof.

In the step 222, the circuit 140 may divide the signal T2 into the recovered blocks SCRAMBLED TEXT' (abbreviated ST'). The circuit 142 may calculate the recovered blocks PLAIN TEXT' (abbreviated PT') with the AES-CBC encryption process operating on the blocks SCRAMBLED TEXT' in the step 224. The AES-CBC encryption process may utilize the control word of the signal CW and initialization vector of the signal IV. The circuit 142 (154) may buffer the blocks PLAIN TEXT' in the step 226.

In the step 228, the circuit 144 generally extracts the message authentication code (MAC) from the blocks PLAIN TEXT'. The extracted MAC may be compared with the original MAC by the circuit 144 in the step 230. If the original MAC does not match the extracted MAC (e.g., the NO branch of step 230), the circuit 144 may generate the signal STATUS2 in the fail state (e.g., de-asserted) in the step 232. If the original MAC matches the extracted MAC (e.g., the YES branch of step 230), the circuit 144 may generate the signal STATUS2 in the pass state (e.g., asserted) in the step 234. In the step 236, the original message may be recovered from the blocks PLAIN TEXT' by the circuit 144 and presented in the signal MESSAGE'.

The processes 200 and 220 are generally simple and effective at (i) protecting against corruption of the message in transit and (ii) concealing the content of the message. The processes 200 and 220 may rely on a secure method outside of the signals T1 and T2 for exchanging keys (e.g., CW and IV) between the source and the destination. If any data within any of the blocks SCRAMBLED TEXT in the signal T1 is altered (e.g., Signal T2≠signal T1) during transmission and/or storage, the influencing effect of each received block SCRAMBLED TEXT' on the recovery of the last block PLAIN TEXT' K may alter the message authentication code carried therein. As such, data alteration during transmission and/or storage is generally detectable and may result in a failure of the authentication test.

Figure 6:
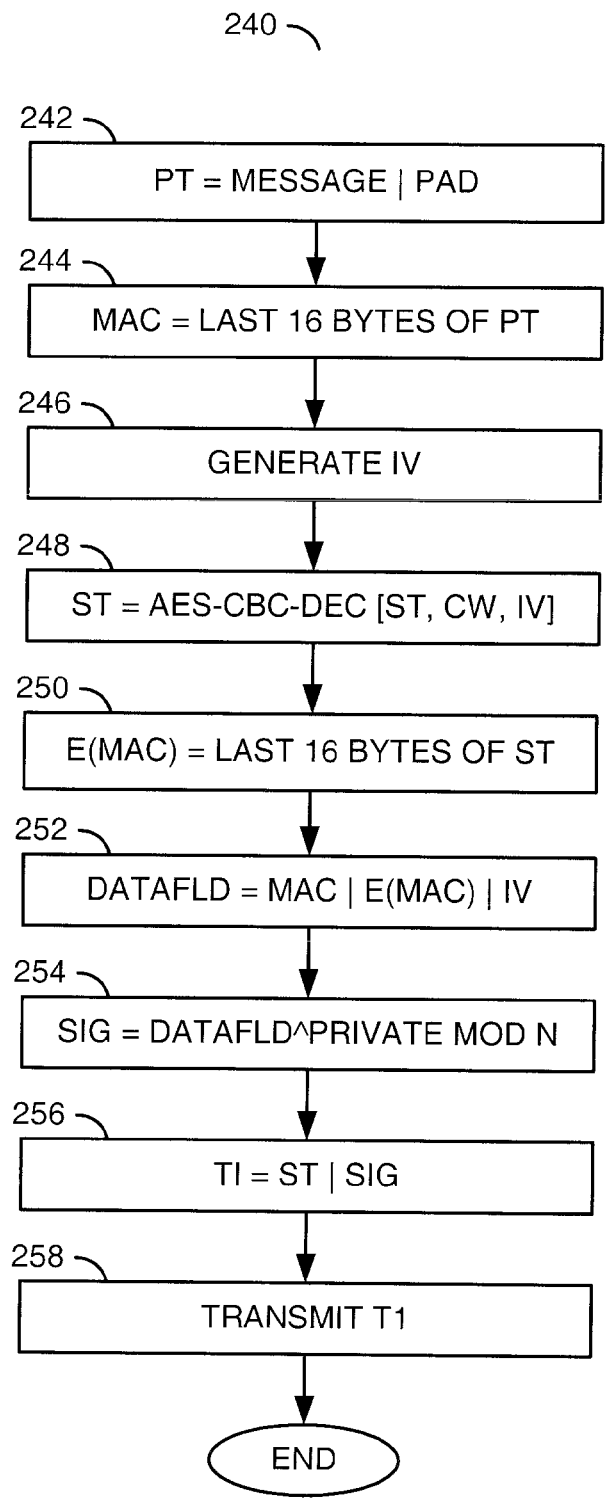
FIG. 6 is a flow diagram of an example process implementing an asymmetric scrambling technique.

Referring to FIG. 6, a flow diagram of an example process 240 implementing the asymmetric scrambling technique at a source is shown. The process (or method) 240 generally comprises a step (or block) 242, a step (or block) 244, a step (or block) 246, a step (or block) 248, a step (or block) 250, a step (or block) 252, a step (or block) 254, a step (or block) 256 and a step (or block) 258. The process 240 may be implemented by the circuit 102. The steps 242 to 258 may be implemented in hardware, software, firmware or any combination thereof.

In the step 242, the circuit 120 may pad a message with random bytes in order to form the multi-byte (e.g., 16-byte) aligned blocks PLAIN TEXT in the signals PTa-PTk. The circuit 240 may establish the MAC in the step 244 as the last several (e.g., 16) bytes of the blocks PLAIN TEXT. In the step 246, the circuit 240 generally creates the initialization vector as a message digest using a Secure Hash Algorithm (e.g., SHA-1) process run over the blocks PLAIN TEXT. The resulting initialization vector may be a random number. The SHA-1 process is defined by "Secure Hash Standard", FIPS PUB 180-3, published October 2005 by the National Institute of Standards and Technology, Gaithersburg, Md., and is hereby incorporated by reference in its entirety. Other hashing functions may be used, for example SHA-256 or AES-Hash.

In the step 248, the blocks SCRAMBLED TEXT may be calculated by the circuit 122 with the AES-CBC decrypted process operating on the blocks PLAIN TEXT. The AES-DEC decryption process may utilize the control word of the signal CW and the initialization vector received from the circuit 120 via the signal IV. The blocks SCRAMBLED TEXT may be presented to the circuit 144 in the signals STa-STk.

A last fixed number (e.g., 16) of bytes in the blocks SCRAMBLED TEXT may be captured by the circuit 144 in the step 250 to establish an encoded message authentication code (e.g., E(MAC)). A data field (e.g., DATAFLD) may be formed by the circuit 122 in the step 252 by concatenating E(MAC), MAC and IV. A digital signature (e.g., SIG) is calculated in the step 254 by the circuit 144 using the RSA process. The RSA process generally utilizes the private exponent in the signal PRIVATE and the modulus value in the signal N. The RSA process is defined in U.S. Pat. No. 4,405,829, and is hereby incorporated by reference in its entirety. Other asymmetric techniques may be used, for example Elliptical Curve Encryption (ECC). In the step 256, the individual blocks PLAIN TEXT may be combined by the circuit 124 to generate the signal T1. The signal T1 may be transmitted by the circuit 124 in the step 258.

Figure 7:
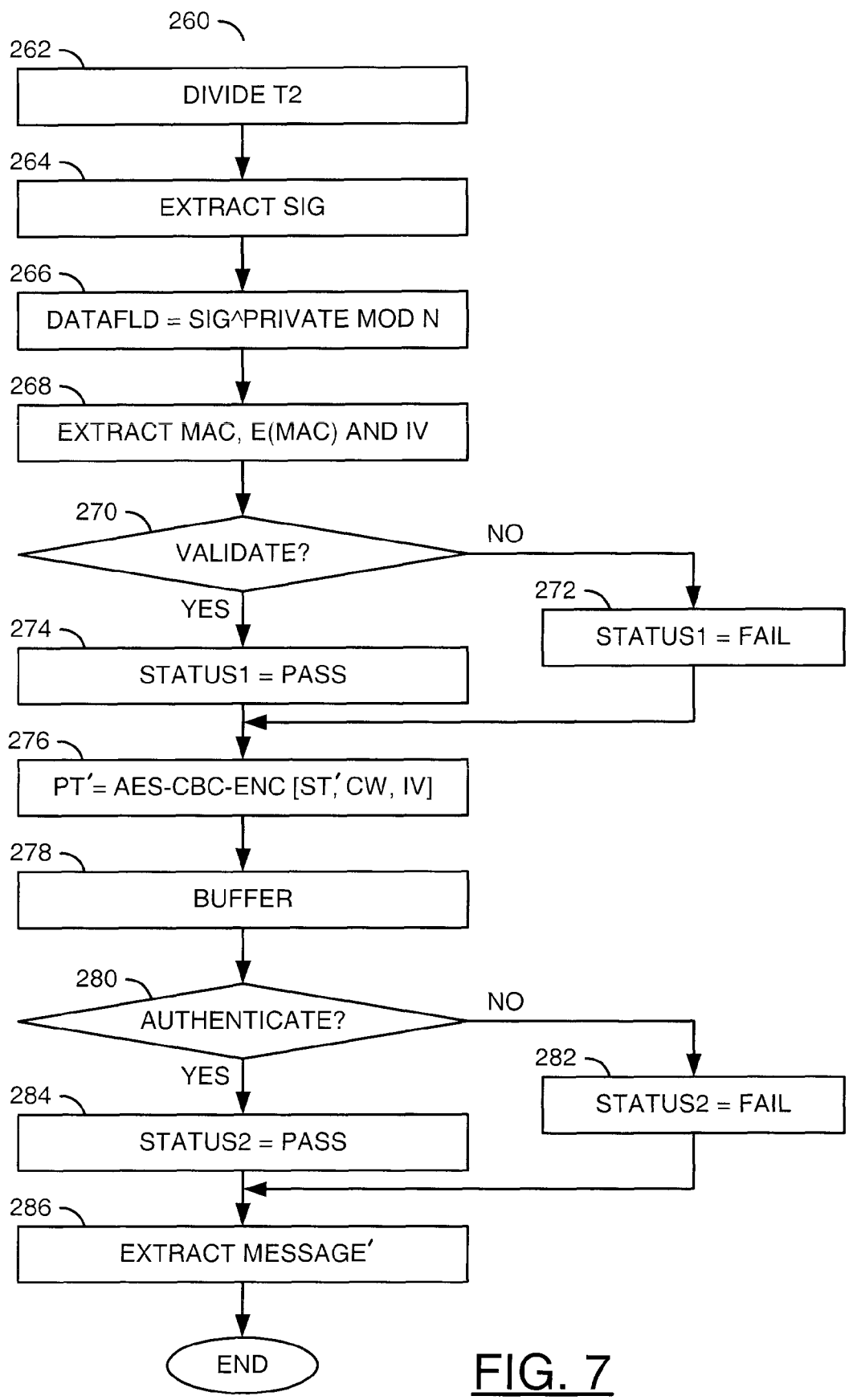
FIG. 7 is a flow diagram of an example process implementing an asymmetric de-scrambling technique.

Referring to FIG. 7, a flow diagram of an example process 260 implementing the asymmetric de-scrambling technique at a destination is shown. The process (or method) 260 generally comprises a step (or block) 262, a step (or block) 264, a step (or block) 266, a step (or block) 268, a step (or block) 270, a step (or block) 272, a step (or block) 274, a step (or block) 276, a step (or block) 278, a step (or block) 280, a step (or block) 282, a step (or block) 284 and a step (or block) 286. The process 260 may be implemented by the circuit 106. The steps 262 to 286 may be implemented in hardware, software, firmware or any combination thereof.

In the step 262, the circuit 140 may divide the signal T2 to recover the blocks SCRAMBLED TEXT'. The circuit 140 may extract the digital signature (SIG) from the blocks SCRAMBLED TEXT' in the step 264. In the step 266, the circuit 140 may recreate the data field (DATAFLD) using the public exponent received in the signal PUBLIC and modulus value received in the signal N. In the step 268, the E(MAC), the MAC and the IV may be extracted from the calculated data field by the circuit 140. The circuit 140 may verify the digital signature in the step 270 by comparing the extracted E(MAC) with a number (e.g., 16) of last bytes in the blocks SCRAMBLED TEXT'. If the extracted E(MAC) does not match the last number of bytes (e.g., the NO branch of step 270), the circuit 140 may generate the signal STATUS1 in the fail state (e.g., de-asserted) in the step 272 to indicate that the signal T2 has an incorrect digital signature. If the extracted E(MAC) matches the given last number of bytes (e.g., the YES branch of step 270), the circuit 140 may generate the signal STATUS1 in the pass state (e.g., asserted) in the step 274.

In the step 276, the circuit 142 may calculate the blocks PLAIN TEXT' using the AES-CBC encryption process operating on the blocks SCRAMBLED TEXT'. The AES-CBC encryption process may utilize the codeword received in the signal CW from the circuit 140 and the initialization vector received in the signal IV from the circuit 140. The circuit 142 (154) may buffer the resulting blocks PLAIN TEXT' in the step 278.

In the step 280, the circuit 144 may test the blocks PLAIN TEXT' for authentication. The authentication may compare the message authentication code received in the signal MAC from the circuit 140 with the extracted message authentication code (e.g., the last 16 bytes of the blocks PLAIN TEXT'). If the authentication fails (e.g., the NO branch of step 280), the circuit 144 may generate the signal STATUS2 in the fail state. If the authentication passes (e.g., the YES branch of step 280), the circuit 144 may generate the signal STATUS2 in the pass state. In the step 286, the circuit 144 may extract the message from the blocks PLAIN TEXT' and present the extracted message in the signal MESSAGE'.

The asymmetric technique is generally more complex than the symmetric technique and may provide advantages. For example, if an adversary knows the CW but not the RSA key, the adversary may not be able to forge messages for (i) lack of knowledge of the private key and (ii) an inability to synthesize the correct IV. The CW and the IV may be transferred from the source to the destination as part of the signal T1 and thus an alternate secure mechanism to transport CW and IV may be avoided. If validation using the E(MAC) fails, the receiver does not have to perform the signature check and so reduces the access to the public key by the adversary. For example, if the receiver does not have to perform the RSA operation, the adversary generally has a reduced opportunity to determine the RSA key value by virtue of the RSA key not being accessed. In another example, if the adversary knows the private key, the adversary may not be able to encrypt messages for lack of knowledge of the CW. Furthermore, the adversary may not be able to pass a forged message because the authentication test would fail.

Figure 8:
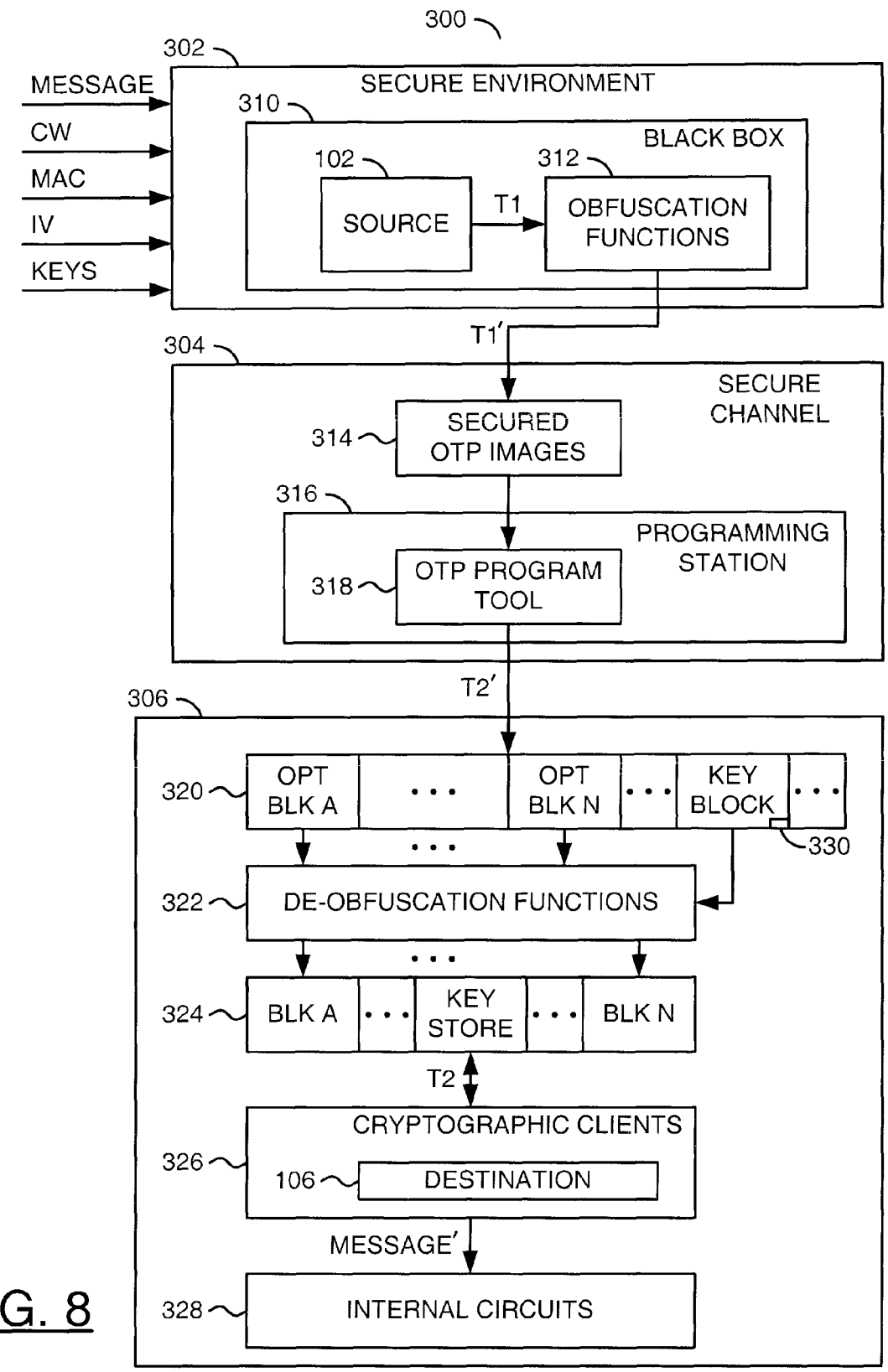
FIG. 8 is a block diagram of an example implementation of a system for a secure boot.

Referring to FIG. 8, a block diagram of an example implementation of a system 300 for a secure boot is shown. The system 300 may be a variation of the system 100 directed to one or more particular applications. The system 300 generally comprises a circuit (or module) 302, a circuit (or module) 304 and a circuit (or module) 306. The circuits 302 and 306 may be supersets of the circuits 102 and 106 respectively. The circuits 302 to 306 may be implemented in hardware, software, firmware or any combination thereof.

The system 300 generally addresses certain security issues that may be associated with recording secret values within a One-Time Programming (OTP) memory of a chip, die or integrated circuit (e.g., the circuit 306). The secret values may be stored for a long time and may be used to secure a programming stage within the chip during a secure boot.

The circuit 302 generally comprises a circuit (or module) 310. The circuit 302 may implement a secure environment platform. The circuit 310 may operate as a black box within the secure environment. The circuit 310 generally comprises the circuit 102 and one or more circuits (or modules) 312. The circuit 102 may be utilized to perform a scrambling process (e.g., process 200 or process 240) to generate the signal T1. The circuit 312 may implement one or more obfuscation circuits, each configured to perform a different obfuscation operation (e.g., F( )). The circuit 302 generally creates secure OTP images from the messages and the information provided by clients. The circuit 302 may transfer secure OTP images to the circuit 304 via a signal (e.g., T1').

The circuit 304 generally comprises a circuit (or module) 314 and a circuit (or module) 316. The circuit 314 may implement a memory configured to store one or more secure OTP images at a time. The circuit 316 generally implements a programming station. The circuit 316 may include a circuit (or module) 318. The circuit 318 may implement an OTP programming tool configured to program OTP type memories in the circuit 306 via a signal (e.g., T2').

The circuit 306 generally comprises a circuit (or module) 320, one or more circuits (or modules) 322, a circuit (or module) 324, one or more circuits (or modules) 326 and one or more circuits (or modules) 328. The circuit 320 may implement the OTP memory. The circuit 322 generally implement one or more de-obfuscation circuits, each configured to perform a different de-obfuscation function (e.g., $F^{-1}( )$). In some embodiments, the circuit 322 may be implemented as a hardware-only circuit. The circuit 324 may be implemented as a key store circuit. The circuit 324 may generate and present the signal T2 to the circuit 326. In some embodiments, the circuits 322 and 324 may form a single circuit (or module). The circuit 326 generally implements one or more cryptographic clients. At least one of the circuits 326 generally includes the circuit 106 to perform the de-scrambling process (e.g., process 220 or process 260) of the signal T2. The circuit 328 may implement one or more circuits internal to the circuit 306. At least one of the circuits 328 may be provisioned with the message recovered by the circuit 326 (106). The recovered message may be presented in the signal MESSAGE'.

An overview of the operation of the system 300 may be as follows. The circuit 302 generally implements a secure environment platform. The circuit 302 may be operational to conceal a message to create a secure OTP image. The concealing may be based on information determined by the client (e.g., keys, CW, IV, MAC and the like). The message may be scrambled by the circuit 310 (102) and obfuscated by the circuit 312 offline within a block-box system to create the secure OTP image. The secure OTP image is generally transmitted over a secure channel in the signal T1' to the circuit 304.

The circuit 304 may include the programming station 316. The programming station 316 is generally operational to program the circuit 306 with the secure OTP image and one or more obfuscation values (e.g., Key Block). Programming may be performed through the signal T2'.

A design of the circuit 306 generally includes the hardware-only de-obfuscation functions in the circuits 322. The de-obfuscation functions may be used to de-obfuscate all or selected contents stored in the circuit 320 after reset. Each of the de-obfuscation functions generally uses the Key Block values from the circuit 320 to control the de-obfuscations. The Key Block values may be programmed uniquely for each customer. The de-obfuscated content may be stored in the circuit 324 after reset. From the circuit 324, the still scrambled content may be de-scrambled by one or more of several cryptographic clients in the circuits 326 (106) to create data suitable for securely provisioning the circuits 328. Taken together, the de-obfuscation and de-scrambling generally create a secure method and/or architecture for retaining secure values within the circuit 306.

From the point of view of a manufacture, multiple de-obfuscation sequences may be built into the circuit 322. A particular de-obfuscation function is generally allocated to a particular customer of the manufacturer. The particular de-obfuscation function may be selected by the manufacturer by controlling several least significant bits (e.g., bits 330) of the Key Bock value. The control generally prevents a secure OTP image created by one company from properly provisioning a circuit 306 owned by another company.

The manufacturer may know all of the de-obfuscation functions. The customers are generally provided with a single tool to perform the manufacturer-selected obfuscation function in the secure environment of the circuit 302. Therefore, the manufacturer generally does not know all of the Key Block values created by the customers. Once the Key Block values are programmed into the circuit 320, access to the circuit 320 may be read/write protected to prevent the Key Block values from being brought outside the circuit 306. The protection generally provides the customers with a mechanism for protecting the secret values programmed into circuit 306 from hackers. Therefore a double blind security system may be achieved where the two parties share information but are unaware of what the other party knows.

Values in the circuit 324 may be de-scrambled during a secure boot by various processes built into the cryptographic clients of the circuits 326. The de-scrambling generally allows for a second layer of security that may be firmware based. If a hacker were to attack the circuit 306, the hacker would have to break the hardware de-obfuscation function security layer and the firmware de-scrambling function security layer to gain control of the circuit 306.

Programming the secure OTP image into the circuit 320 may be done at any one of several various stages. For example, the secure OTP image may be programmed (i) at the chip manufacturing facility, (ii) at a board-level factory and/or (iii) in the field after the product is sold. Since the OTP image may be secured, the Key Block values used by the de-obfuscation functions and the Key or CW used by the de-scrambling functions may be preprogramed into the circuit 306 ahead of time. An image of the obfuscated and scrambled message may then be programmed into the circuit 306 at a later time. Alternately, the secure OTP image may be preprogramed into the circuit 306 ahead of time and the Key Block values, keys and/or CW may be delivered at a later time to unlock the secret values programmed into the circuit 320.

The symmetric (e.g., AES-CBC) aspects and the asymmetric (e.g., RSA) aspects of the scrambling and de-scrambling generally reinforce each other to an extent in that an adversary may have to acquire the CW, the public key and the private key to break the system. The scrambling and de-scrambling processes may also be computationally optimized to allow for simple tests to be performed before computationally intense tests are performed.

The symmetric technique and the asymmetric technique may each have particular advantages. The symmetric technique is generally computationally efficient. The asymmetric technique may have a benefit in that the authentication step takes advantage of the public/private key relationship. Therefore, even if the adversary determines the CW and the IV and knows the public key, a forged message may still fail the authentication test.

An economy generally results from calculating the MAC and de-scrambling the blocks SCRAMBLED TEXT in a single pass. For example, a single buffer may be implemented in the circuit 106 because the blocks SCRAMBLED TEXT do not have to be preserved. Thus, de-scrambling with the AES-CBC encryption process is generally less computationally expensive and may use less memory than traditional solutions.

The functions performed by the diagrams of FIGS. 1-8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICS (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a first circuit configured to (i) divide a plain text into at least three input blocks and (ii) generate at least three scrambled blocks by scrambling said input blocks using a first cipher process, said first cipher process being configured such that a first of said input blocks does not affect said generation of a last of said scrambled blocks; and
a second circuit configured to (i) generate at least three output blocks by de-scrambling said scrambled blocks using a second cipher process and (ii) reconstruct said plain text from said output blocks, said second cipher process being configured such that the plain text from a first of said scrambled blocks is arithmetically combined with at least one other of said output blocks in de-scrambling the at least one other of said output blocks.

2. The apparatus according to claim 1, wherein said second circuit is further configured to authenticate a message within said plain text using an authentication code within said plain text.

3. The apparatus according to claim 1, wherein said first circuit is further configured to (i) generate a data field incorporating an authentication code and (ii) generate a signature based on both said data field and a private key.

4. The apparatus according to claim 1, wherein said second circuit is further configured to store said scrambled blocks such as to be inaccessible outside of said second circuit.

5. The apparatus according to claim 1, wherein said first circuit is further configured to obfuscate said scrambled blocks before said scrambled blocks are transferred to said second circuit.

6. The apparatus according to claim 1, wherein (i) said first cipher process comprises an Advanced Encryption Standard-Cipher Block Chaining decryption process and (ii) said second cipher process comprises an Advanced Encryption Standard-Cipher Block Chaining encryption process.

7. The apparatus according to claim 2, wherein said second circuit is further configured to generate said output blocks such that said message is both (i) recovered and (ii) authenticated in a single pass through said second circuit using a single buffer.

8. The apparatus according to claim 3, wherein said second circuit is further configured to (i) reconstruct said data field using a public key that corresponds to said private key, (ii) validate said scrambled blocks using said authentication code and (iii) authenticate a message within said plain text using said authentication code.

9. The apparatus according to claim 4, wherein said second circuit is further configured to (i) access said scrambled blocks during a secure boot and (ii) provision said second circuit using said plain text.

10. The apparatus according to claim 5, wherein said second circuit is further configured to de-obfuscate said scrambled blocks prior to said de-scrambling.

11. A method for concealing plain text in scrambled blocks, comprising the steps of:
   (A) dividing said plain text into at least three input blocks via a pre-processor;
   (B) generating via a scrambler, at least three of said scrambled blocks by scrambling said input blocks using a first cipher process in a first circuit, said first cipher process being configured such that a first of said input blocks does not affect said generation of a last of said scrambled blocks;
   (C) generating, via a descrambler, at least three output blocks by de-scrambling said scrambled blocks using a second cipher process in a second circuit, said second cipher process being configured such that the plain text from a first of said scrambled blocks is arithmetically combined with at least one other of said output blocks in de-scrambling the at least one other of said output blocks; and
   (D) reconstructing said plain text from said output blocks via a post processor.

12. The method according to claim 11, further comprising the step of:
   authenticating a message within said plain text using an authentication code within said plain text.

13. The method according to claim 11, further comprising the steps of:
   generating a data field incorporating an authentication code; and
   generating a signature based on both said data field and a private key.

14. The method according to claim 11, further comprising the step of:
   storing said scrambled blocks in said second circuit such as to be inaccessible outside of said second circuit.

15. The method according to claim 11, further comprising the step of:
   obfuscating said scrambled blocks before said scrambled blocks are transferred to said second circuit.

16. The method according to claim 12, wherein said output blocks are generated such that said message is both (i) recovered and (ii) authenticated in a single pass through said second circuit using a single buffer.

17. The method according to claim 13, further comprising the steps of:
   reconstructing said data field using a public key that corresponds to said private key;
   validating said scrambled blocks using said authentication code; and
   authenticating a message within said plain text using said authentication code.

18. The method according to claim 14, further comprising the steps of:
   accessing said scrambled blocks during a secure boot of said second circuit; and
   provisioning said second circuit using said plain text.

19. The method according to claim 15, further comprising the step of:
   de-obfuscating said scrambled blocks prior to said descrambling.

* * * * *